United States Patent
Hong et al.

(10) Patent No.: US 7,843,409 B2
(45) Date of Patent: Nov. 30, 2010

(54) DUAL PANEL APPARATUS AND METHOD OF DRIVING THE SAME

(75) Inventors: Young Jun Hong, Daegu (KR); Hak Su Kim, Seoul (KR); Jae Do Lee, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 622 days.

(21) Appl. No.: 11/387,838

(22) Filed: Mar. 24, 2006

(65) Prior Publication Data

US 2006/0256103 A1 Nov. 16, 2006

(30) Foreign Application Priority Data

Apr. 27, 2005 (KR) .................. 10-2005-0034938
Apr. 27, 2005 (KR) .................. 10-2005-0034940

(51) Int. Cl.
  *G09G 3/32* (2006.01)
(52) U.S. Cl. .......................... 345/82; 345/76
(58) Field of Classification Search ............... 345/76, 345/82, 78
  See application file for complete search history.

(56) References Cited

U.S. PATENT DOCUMENTS

| | | | |
|---|---|---|---|
| 5,881,299 A | 3/1999 | Nomura et al. | |
| 6,473,064 B1 | 10/2002 | Tsuchida et al. | |
| 7,301,509 B2 * | 11/2007 | Yun et al. | 345/1.3 |
| 2003/0006713 A1 * | 1/2003 | Kim et al. | 315/169.2 |
| 2003/0151570 A1 * | 8/2003 | LeChevalier et al. | 345/84 |
| 2004/0021616 A1 | 2/2004 | Goto et al. | |
| 2004/0183745 A1 | 9/2004 | Choi | |
| 2004/0222943 A1 | 11/2004 | Kudo et al. | |
| 2005/0219150 A1 | 10/2005 | Park et al. | |
| 2005/0253799 A1 | 11/2005 | Kamio | |

FOREIGN PATENT DOCUMENTS

| | | |
|---|---|---|
| CN | 1475838 A | 2/2004 |
| EP | 1 274 065 A2 | 1/2003 |
| EP | 1 619 653 A2 | 1/2006 |
| KR | 10-2006-0015113 A | 2/2006 |
| WO | WO-02/091341 A2 | 11/2002 |
| WO | WO-2004/029918 A | 4/2004 |

* cited by examiner

*Primary Examiner*—Chanh Nguyen
*Assistant Examiner*—Tsegaye Seyoum
(74) *Attorney, Agent, or Firm*—Birch, Stewart, Kolasch & Birch LLP

(57) ABSTRACT

The present relates to a dual panel apparatus including two panels driven simultaneously. The dual panel apparatus includes a first panel, a second panel and a data driver. The first panel has a plurality of pixels formed in cross areas of data lines and first scan lines. The second panel has a plurality of second pixels formed in cross areas of the data lines and second scan lines. The data driver provides compensating precharge current to one or more data line. The dual panel apparatus uses two panels as main display device and sub display device, and thus the unit cost of the dual panel apparatus is reduced.

11 Claims, 7 Drawing Sheets

DUAL PANEL APPARATUS AND METHOD OF DRIVING THE SAME

BACKGROUND OF THE INVENTION

1. Field of the Invention

The present invention relates to a dual panel apparatus. More particularly, the present invention relates to a dual panel apparatus including two panels driven simultaneously and method of driving the same.

2. Description of the Related Art

A dual panel apparatus uses two panels as main display device and sub display device. For example, the dual panel apparatus is a mobile phone.

The dual panel apparatus uses a liquid crystal display (hereinafter, referred to as "LCD") as main display device, and organic electroluminescent panel as sub display device. Therefore, the dual panel apparatus should include a first integrated circuit chip for driving the LCD and a second integrated circuit chip for driving the organic electroluminescent panel. As a result, the size of the dual panel apparatus is increased.

In addition, because price of the LCD is higher than that of the organic electroluminescent panel, price of the dual panel apparatus is increased.

SUMMARY OF THE INVENTION

It is a feature of the present invention to provide a dual panel apparatus whose price and size are reduced and method of driving the same.

A dual panel apparatus according to one embodiment of the present invention includes a first panel, a second panel and a data driver. The first panel has a plurality of pixels formed in cross areas of data lines and first scan lines. The second panel has a plurality of second pixels formed in cross areas of the data lines and second scan lines. The data driver provides compensating precharge current to one or more data line.

A dual panel apparatus according to another embodiment of the present invention includes a first panel, a second panel and a data driver. The first panel has a plurality of first pixels formed in cross areas of first anode electrode layers and first cathode electrode layers. The second panel has a plurality of second pixels formed in cross areas of second anode electrode layers and second cathode electrode layers. The data driver is located between the first panel and the second panel, and drives simultaneously the first panel and the second panel.

A method of driving a dual panel apparatus including a first panel having first pixels formed in cross areas of first anode electrode layers and first scan lines and a second panel having second pixels formed in cross areas of second anode electrode layers and second scan lines according to one embodiment of the present invention includes providing first scan signals to the first scan lines; providing second scan signals to the second scan lines; and providing data current to at least one first anode electrode layer and second electrode layer corresponding to the first anode electrode layer.

As described above, the dual panel apparatus and the method of driving the same according to one embodiment of the present invention use two panels as main display device and sub display device, and thus the unit cost of the dual panel apparatus is reduced. In addition, the size of the dual panel apparatus may be decreased.

Moreover, since the dual panel apparatus according to another embodiment of the present invention employs stack-typed panel, the dual panel apparatus is proper to employ a large size panel.

Additionally, the dual panel apparatus and the method of driving the same according to still another embodiment of the present invention provide compensating precharge current to the data lines, and so the pixels may emit a light having the desired brightness.

Further, in the dual panel apparatus according to still another embodiment of the present invention, a data driver is located between a first panel and a second panel, and thus the dual panel apparatus may be miniaturized.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF EMBODIMENTS

Hereinafter, the preferred embodiments of the present invention will be explained in more detailed with reference to the accompanying drawings.

Figure 1:
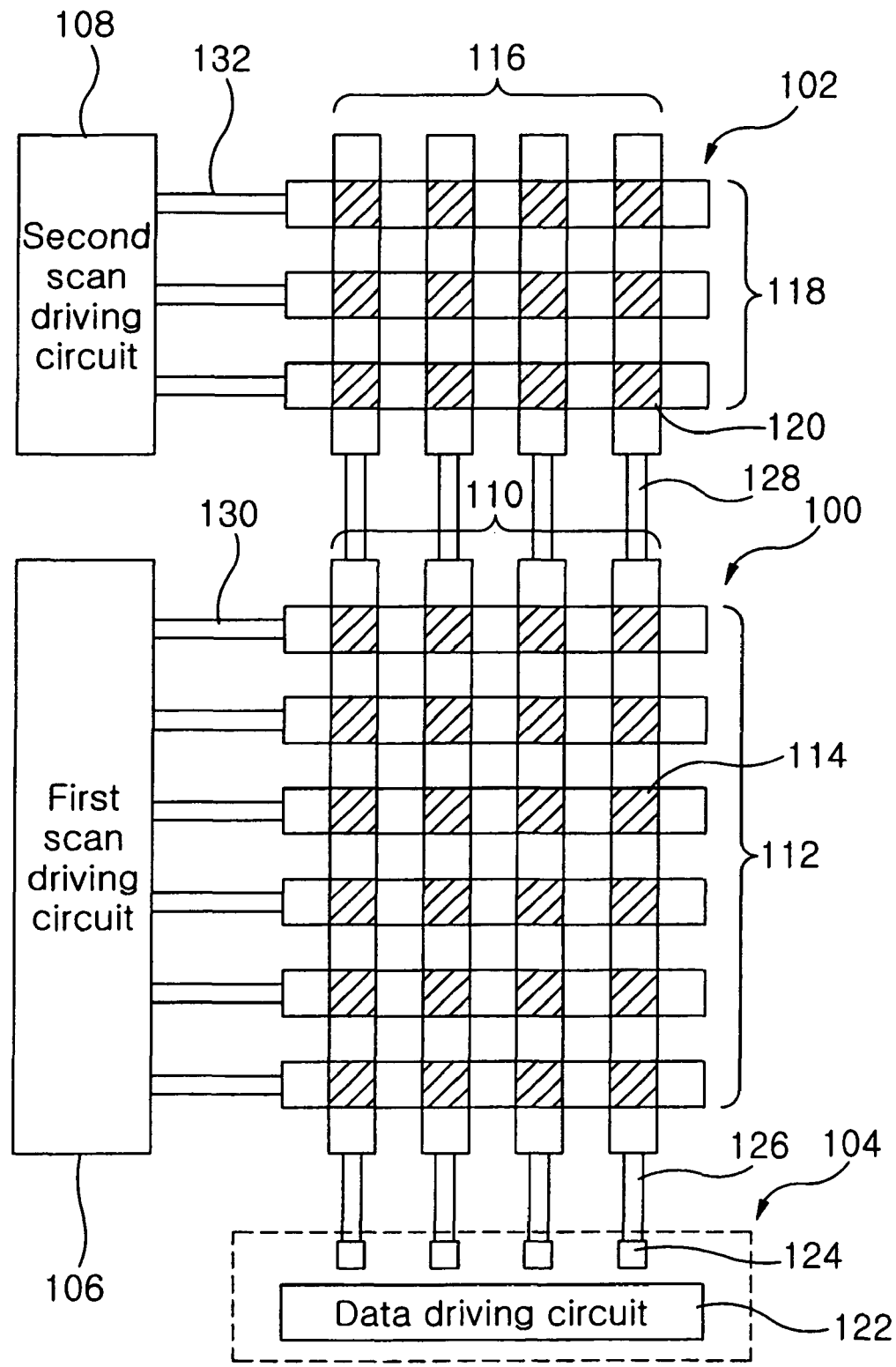
FIG. 1 is a view illustrating a dual panel apparatus according to a first embodiment of the present invention.

FIG. 1 is a view illustrating a dual panel apparatus according to a first embodiment of the present invention.

In FIG. 1, the dual panel apparatus of the present invention includes a first panel 100, a second panel 102, a data driver 104, a first scan driving circuit 106 and a second scan driving circuit 108.

The first panel 100 according to one embodiment of the present invention is main panel, and the second panel 102 is sub panel.

The first panel 100 as strip-typed panel includes a plurality of first pixels 114 formed in cross areas of first anode electrode layers 110 and first cathode electrode layers 112.

Each of the first pixels 114 includes the first anode electrode layer 110, an organic layer and the first cathode electrode layer 112 deposited in sequence.

The second panel 102 includes a plurality of second pixels 120 formed in cross areas of second anode electrode layers 116 and second cathode electrode layers 118.

The data driver 104 includes a plurality of pads 124 connected to the first anode electrode layers 110 through first data lines 126, and a data driving circuit 122.

The data driving circuit 122 transmits data signals to the first anode electrode layers 110 through the pads 124 and the first data lines 126. In this case, the data signals transmitted to the first anode electrode layers 110 sent to the second anode electrode layers 116 through second data lines 128.

The first scan driving circuit 106 transmits first scan signals to the first cathode electrode layers 112 through first scan lines 130.

The second scan driving circuit 108 transmits second scan signals to the second cathode electrode layers 118 through second scan lines 132.

In brief, the dual panel apparatus of the present invention uses one data driver 104 unlike the dual panel apparatus described in Related Art using two data drivers. Accordingly, the dual panel apparatus of the present invention may be downsized compared with the dual panel apparatus described in Related Art.

At least one of the panels 100 and 102 of the present invention is organic electroluminescent panel. Here, pixel included in the organic electroluminescent panel has an organic layer. In this case, a unit cost of the dual panel apparatus may be reduced because the organic electroluminescent panel is cheaper than the LCD.

In the dual panel apparatus according to another embodiment of the present invention, the number of first anode electrode layers of the first panel 100 may be more than that of second anode electrode layers of the second panel 102.

Figure 2A:
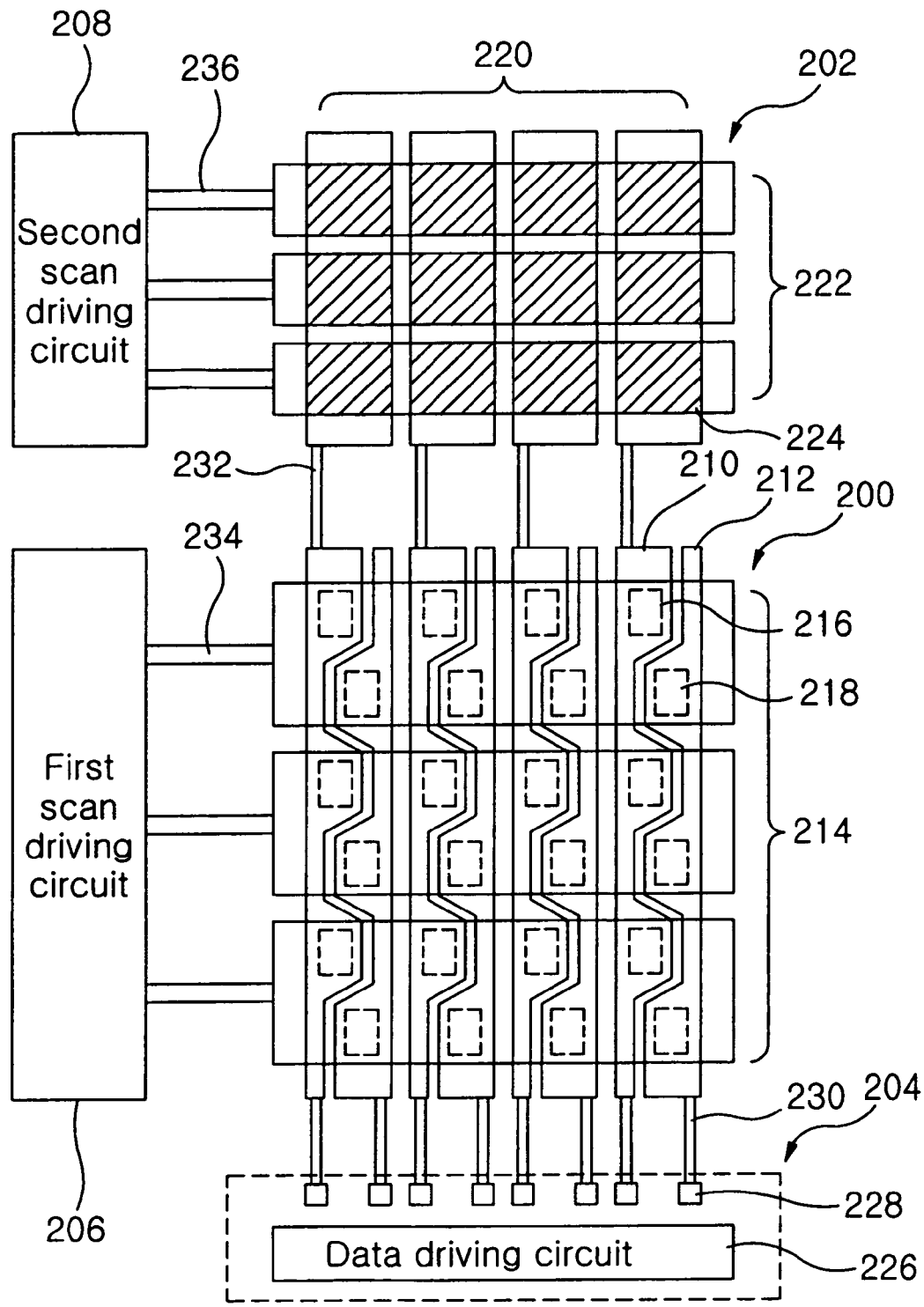
FIG. 2A is a view illustrating a dual panel apparatus according to a second embodiment of the present invention.

FIG. 2A is a view illustrating a dual panel apparatus according to a second embodiment of the present invention.

In FIG. 2A, the dual panel apparatus of the present invention includes a first panel 200, a second panel 202, a data driver 204, a first scan driving circuit 206 and a second scan driving circuit 208.

Hereinafter, the panels 200 and 202 are assumed as the organic electroluminescent panels.

The first panel 200 as stack-typed panel includes first anode electrode layers and first cathode electrode layers 214.

Each of the first anode electrode layers includes a first sub anode electrode layer 210 and a second sub anode electrode layer 212.

First sub pixels 216 are formed in cross areas of the first sub anode electrode layers 210 and the cathode electrode layers 214.

Second sub pixels 218 are formed in cross areas of the second sub anode electrode layers 212 and the cathode electrode layers 214.

In short, in the stack-typed panel, the number of the cathode electrode layers 214 is half than that of cathode electrode layers of the stripe-typed panel. However, the width of the cathode electrode layers 214 is two times than that of the stripe-typed panel. Hence, the resistance of the cathode electrode layers 214 is lower than that of the cathode electrode layers in the stripe-typed panel. Accordingly, in case of a large size panel, the stack-typed panel is preferable to the stripe-typed panel.

The first panel 200 as main panel according to one embodiment of the present invention has a large size, and thus the type of the first panel 200 prefers stack type to stripe type.

The second panel 202 includes a plurality of second pixels 224 formed in cross areas of the second anode electrode layers 220 and the second cathode electrode layers 222.

In one embodiment of the present invention, the first panel 200 is main panel in the dual panel apparatus, and the second panel 202 is sub-panel.

The data driver 204 includes a data driving circuit 226 and pads 228.

The pads 228 are coupled to the sub anode electrode layers 210 and the sub anode electrode layers 212. In addition, the pads 228 are coupled to the data driving circuit 226.

The data driving circuit 226 provides first data signals to the first sub anode electrode layers 210 through a part of the pads 228 and first connecting lines 230 corresponding to the part. In this case, the first data signals provided to the first anode electrode layers 210 is transmitted to the second anode electrode layers 220 through second connecting lines 232. Additionally, the data driving circuit 226 provides second data signals to the second sub anode electrode layers 212 through the other pads and the first connecting lines 230 corresponding to the other pads.

The first scan driving circuit 206 transmits first scan signals to the first cathode electrode layers 214 through first scan lines 234.

The second scan driving circuit 208 transmits second scan signals to the second cathode electrode layers 222 through second scan lines 236.

As described above, the first panel 200 as main panel is stack-typed panel, and thus the dual panel apparatus of the present invention is proper to a dual panel apparatus of large size.

In the dual panel apparatus according to another embodiment of the present invention, the number of first anode electrode layers of the first panel 200 may be more than that of second anode electrode layers of the second panel 202.

Figure 2B:
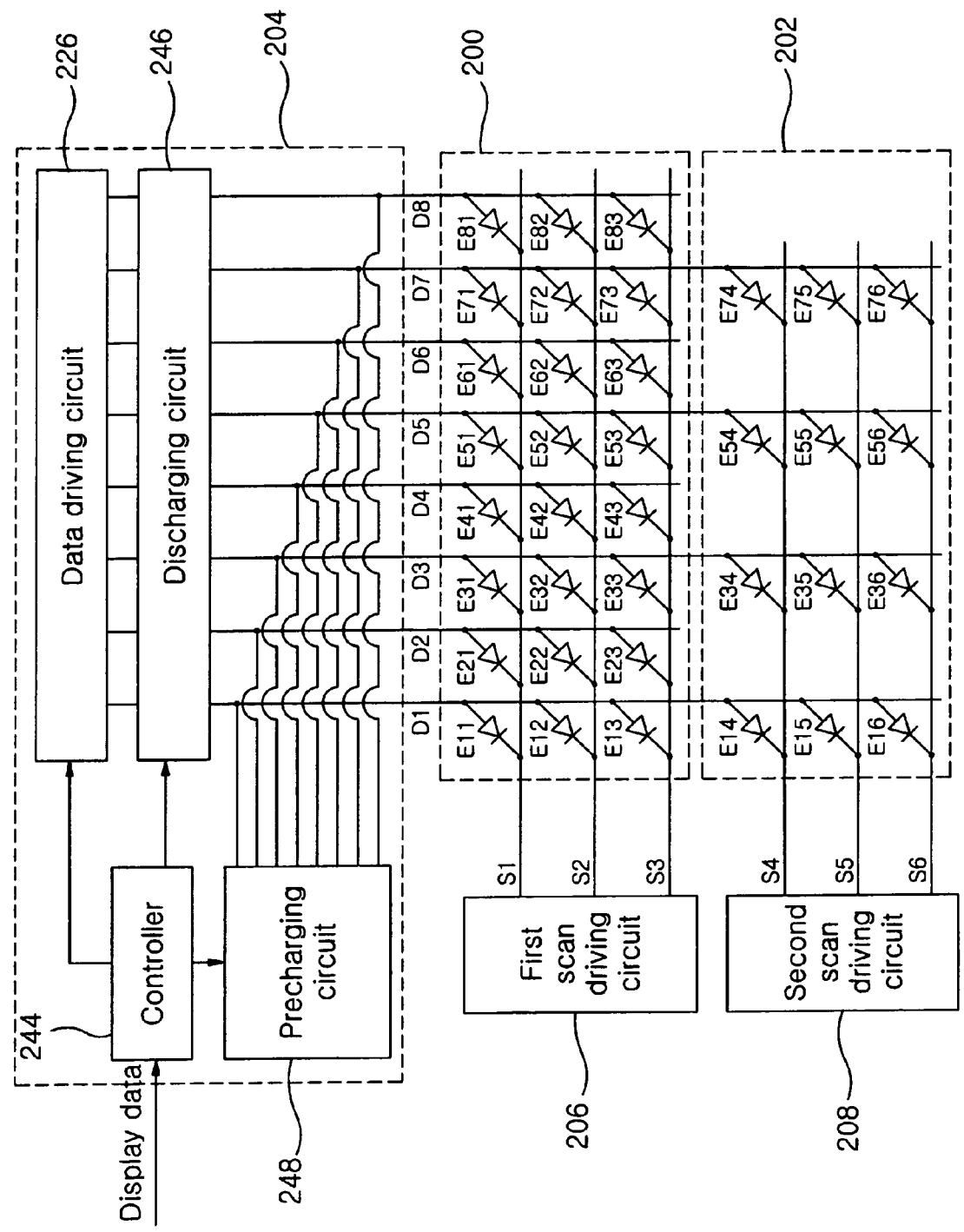
FIG. 2B is a view illustrating a circuitry of the dual panel apparatus of FIG. 2A.

FIG. 2B is a view illustrating a circuitry of the dual panel apparatus of FIG. 2A.

In FIG. 2B, the first panel 200 includes a plurality of first pixels E11 to E83 formed in cross areas of data lines D1 to D8 and first scan lines S1 to S3. Here, the data lines D1 to D8 includes first data lines D1, D3, D5 and D7 and second data lines D2, D4, D6 and D8.

The second panel 202 includes a plurality of second pixels E14 to E76 formed in cross areas of the first data lines D1, D3, D5 and D7 and second scan lines S4 to S6.

The data driver 204 includes a controller 244, a discharging circuit 246, a precharging circuit 248 and a data driving circuit 226.

The controller 244 stores display data, e.g. RGB data inputted from the outside therein or in its outside memory.

The discharging circuit 246 discharge the data lines D1 to D8 under the control of the controller 244.

The precharging circuit 248 precharges the data lines D1 to D8 by providing precharge current corresponding to the display data transmitted from the controller 244 to the data lines D1 to D8.

The data driving circuit 226 provides data current, i.e. data signals corresponding to the display data transmitted from the controller 244 to the data lines D1 to D8.

Hereinafter, a method of driving the dual panel apparatus of the present invention will be described. For example, a first display data and a second display data are inputted in sequence into the controller 244.

The controller 244 transmits the first display data to the data driving circuit 226.

Subsequently, the data driving circuit 226 provides first current, i.e. first data signals corresponding to the first display data transmitted from the controller 244 to the data lines D1 to D8.

Then, the discharging circuit 246 discharges the data lines D1 to D8 to a certain discharge level under the control of the controller 244.

Subsequently, the controller 244 transmits the second display data to the precharging circuit 248.

Then, the precharging circuit 248 provides precharge current corresponding to the second display data transmitted from the controller 244 to the data lines D1 to D8. Here, the precharging circuit 248 provides further compensating precharge current to the first data lines D1, D3, D5 and D7 so as to compensate the brightness of the pixels corresponding to the first data lines D1, D3, D5 and D7. This will be explained in more detail with reference to the accompanying drawings.

Subsequently, the controller 244 transmits the second display data to the data driving circuit 226.

Then, the data driving circuit 226 provides second data current, i.e. second data signals corresponding to the second display data transmitted from the controller 244 to the data lines D1 to D8.

Figure 3A:
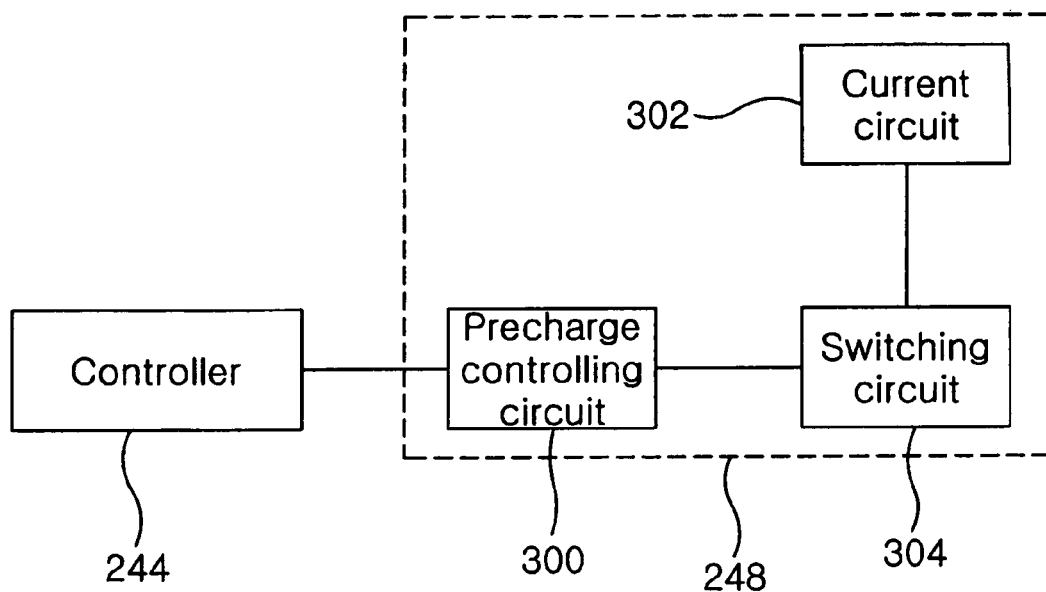
FIG. 3A is a block diagram illustrating the precharging circuit of FIG. 2B.

FIG. 3A is a block diagram illustrating the precharging circuit of FIG. 2B.

In FIG. 3A, the precharging circuit 248 includes a precharge controlling circuit 300, a current circuit 302 and a switching circuit 304.

The precharge controlling circuit 300 transmits control signals to the switching circuit 304 in accordance with the display data transmitted from the controller 244.

The current circuit 302 includes a plurality of current sources.

The switching circuit 304 includes a plurality of switches switched depending on the control signals transmitted from the precharge controlling circuit 300.

Figure 3B:
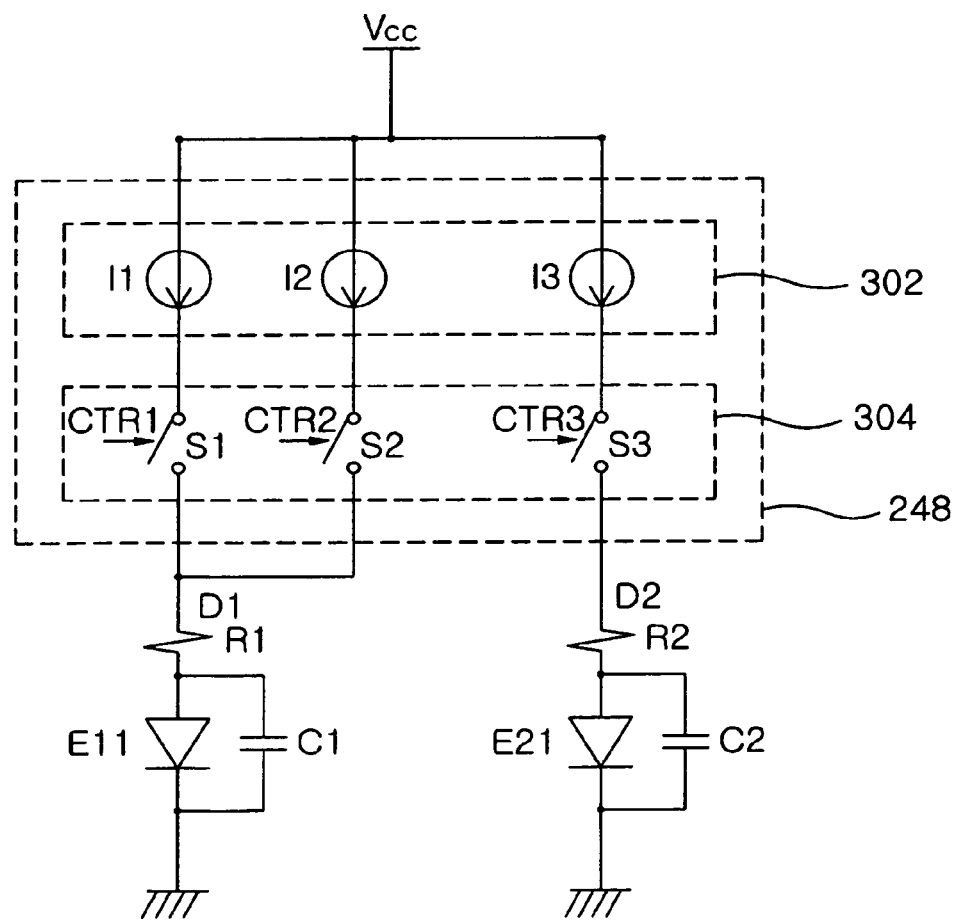
FIG. 3B is a view illustrating a circuitry of the precharging circuit of FIG. 2B according to a first embodiment of the present invention.

FIG. 3B is a view illustrating a circuitry of the precharging circuit of FIG. 2B according to a first embodiment of the present invention. Here, FIG. 3B shows only data lines D1 and D2 for convenience of the description. In addition, a first resistor (R1) and a second resistor (R2) mean resistances of the data lines D1 and D2, respectively. Further, each of a first capacitor (C1) and a second capacitor (C2) indicates capacitances corresponding to pixels E11 and E21.

In FIG. 3B, the precharge controlling circuit 300 transmits control signals CTR1 to CTR3 to the switching circuit 304 in accordance with the display data.

Subsequently, a first switch S1 is turned on by the first control signal CTR1, and so first precharge current I1 is provided to the first data line D1 during on time of the first switch S1. In other words, the first precharge current I1 corresponding to the display data is provided to the first data line D1.

A third switch S3 is turned on by the third control signal CTR3, and so third precharge current I3 is provided to the second data line D2 during on time of the third switch S3.

A second switch S2 is turned on by the second control signal CTR2, and thus second precharge current I2, i.e. compensating precharge current is provided to the first data line D1 during on time of the second switch S2. In other words, the compensating precharge current for compensating current consumption in accordance with the first resistor R1 and the first capacitor C1, i.e. the load condition of the first data line D1 is provided to the first data line D1.

Hereinafter, the compensating process will be described in detail.

The first data line D1 couples the data driver 204 to the second panel 202 through the first panel 200. Hence, the first data line D1 has the first resistor R1 and the first capacitor C1 greater than the second data line D2 coupled to only the first panel 200.

Generally, the brightness of the pixels E11 to E87 is preset with reference to the resistance of a corresponding data line and the capacitance of a corresponding capacitor. In this case, the first resistor R1 and the first capacitor C1 corresponding to the first data line D1 are higher than the second resistor R2 and the second capacitor C2 corresponding to the second data line D2. As a result, the current consumption by the first resistor R1 and the first capacitor C1 is higher than desired current consumption, and thus the pixels corresponding to the first data line D1 have brightness smaller than desired brightness.

For example, a pixel (E14) corresponding to the first data line D1 is preset to emit a light having gray scale of 70 percents (%), and so data current corresponding to the gray scale is provided to the first data line D1. However, the pixel E14 may emit a light having gray scale of 68% due to current consumption by the first resistor R1 and the first capacitor C1. Therefore, the precharging circuit 148 provides the precharge current corresponding to the display data and the compensating precharge current corresponding to gray scale of 2% to the first data line D1.

Then, the data driving circuit 226 provides data current corresponding to the display data to the first data line D1. In this case, because the compensating precharge current compensates the current consumption (2%) corresponding to the first resistor R1 and the first capacitor C1, the pixel E14 emits a light having gray scale of about 70%.

In brief, the dual panel apparatus of the present invention provides the compensating precharge current to the first data lines D1, D3, D5 and D7 by using extra current source except current sources corresponding to the display data. As a result, the pixels included in the dual panel apparatus of the present invention may emit a light having the brightness corresponding to the display data.

Figure 4:
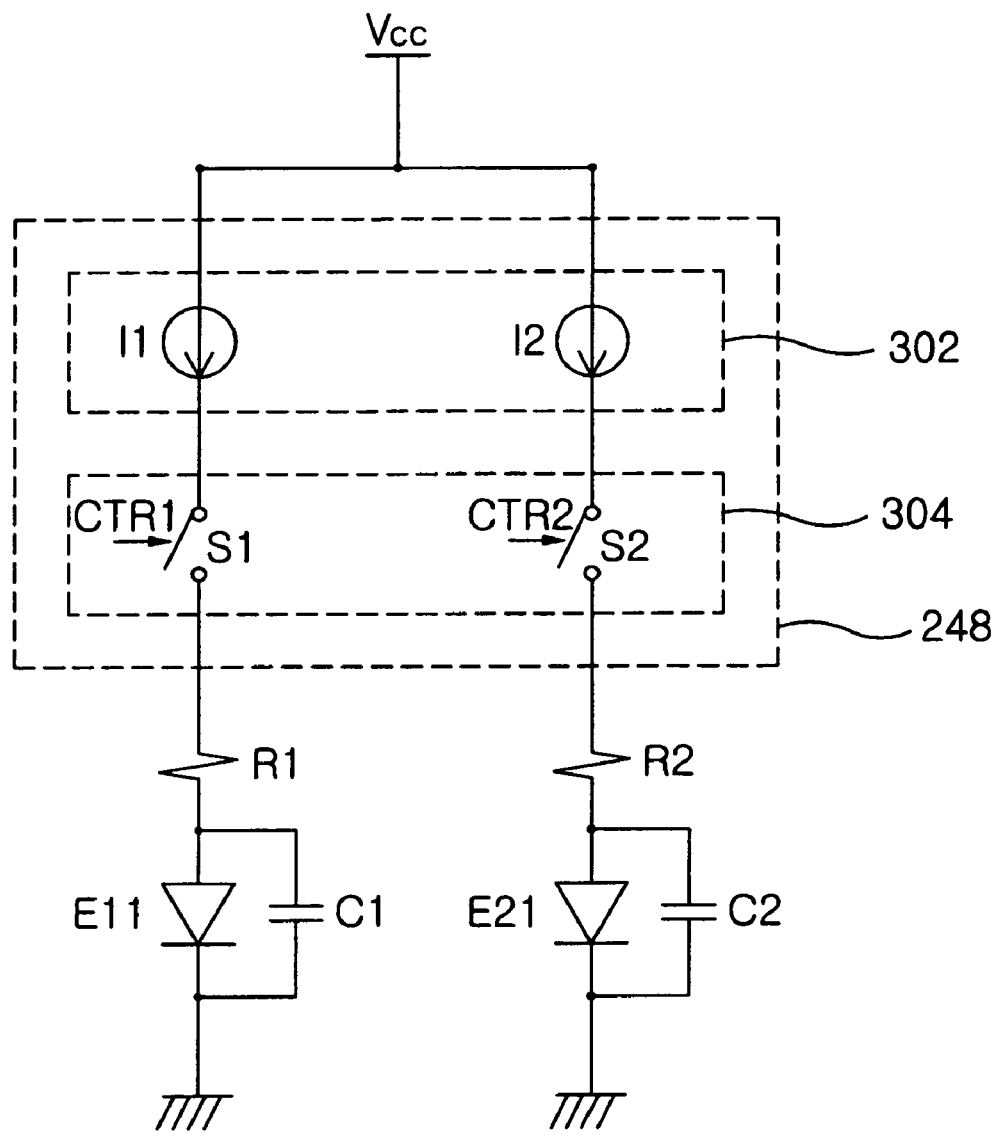
FIG. 4 is a view illustrating a circuitry of the precharging circuit of FIG. 2B according to a second embodiment of the present invention.

FIG. 4 is a view illustrating a circuitry of the precharging circuit of FIG. 2B according to a second embodiment of the present invention.

In FIG. 4, the current source 302 does not include extra current source which provides the compensating precharge current unlike the first embodiment. However, the precharging circuit 248 adjusts on time of a first switch S1 to generate further the compensating precharge current.

For example, the pixel E14 corresponding to the first data line D1 is preset to emit a light having gray scale of 70%. In this case, the precharging circuit 248 precharges the first data line D1 up to about 72% with reference to current consumption by the first resistor R1 and the first capacitor C1.

In particular, the first switch S1 keeps on condition during a first period of time corresponding to the display data and a second period of time corresponding to the load condition of the first data line D1. In other words, the first switch S1 in the second embodiment keeps on condition during a time longer than the first switch in the first embodiment. As a result, the pixel E14 emits a light having gray scale of about 70%.

Figure 5:
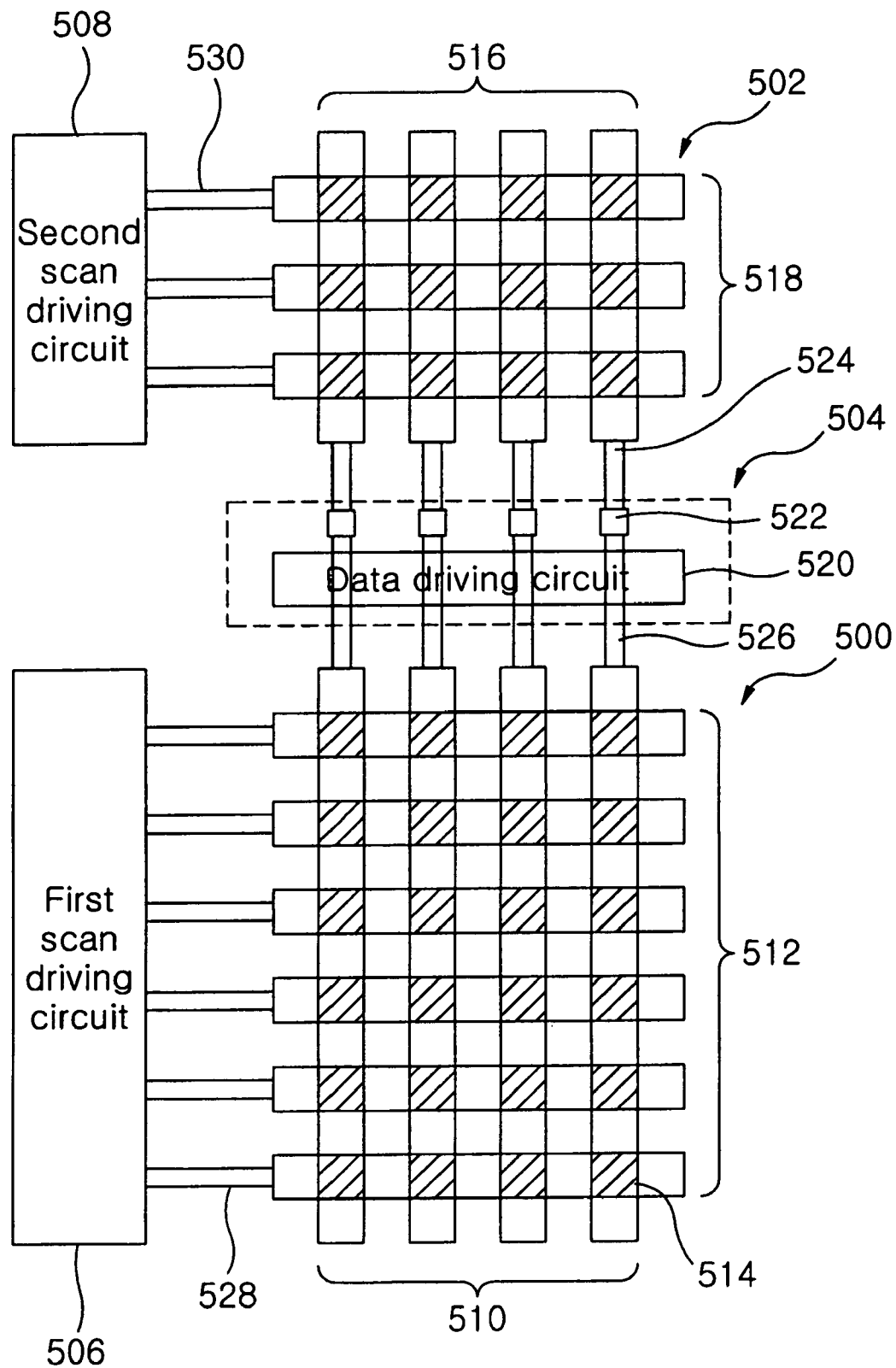
FIG. 5 is a view illustrating a dual panel apparatus according to a third embodiment of the present invention.

FIG. 5 is a view illustrating a dual panel apparatus according to a third embodiment of the present invention.

In FIG. 5, the dual panel apparatus of the present invention includes a first panel 500, a second panel 502, a data driver 504, a scan driving circuit 506 and a second scan driving circuit 508.

The first panel 500 includes a plurality of first pixels 514 formed in cross areas of first anode electrode layers 510 and first cathode electrode layers 512.

The second panel 502 includes a plurality of second pixels formed in cross areas of second anode electrode layers 516 and second cathode electrode layers 518.

The data driver 504 is located between the first panel 500 and the second panel 502, and includes a data driving circuit 520 and a plurality of pads 522.

Each of the pads 522 is coupled to the anode electrode layers 510 and 516 through the data lines 526 and 524.

The first scan driving circuit 506 transmits first scan signals to the first cathode electrode layers 512 through first scan lines 528.

The second scan driving circuit 508 transmits second scan signals to the second cathode electrode layers 518 through second scan lines 530.

Hereinafter, the dual panel apparatuses in the first embodiment and the third embodiment will be compared.

In the dual panel apparatus in the first embodiment, data current is provided to the second anode electrode layers 116 through the first anode electrode layers 110. Hence, to provide desired data current to the second anode electrode layers 110, the data driving circuit 122 provides data current having magnitude two times than current required for the first panel 100 to the first anode electrode layers 110.

However, in the dual panel apparatus in the third embodiment, because the data driver 504 is located between the first panel 500 and the second panel 502, the data driving circuit 520 provides only requisite data current to each of the first panel 500 and the second panel 502. Therefore, the magnitude of the maximum data current in the third embodiment is smaller than that in the first embodiment. Accordingly, the data driving circuit 520 in the third embodiment may include current sources less than the data driving circuit 122 in the first embodiment. As a result, the size of the dual panel apparatus in the third embodiment may be smaller than that in the first embodiment.

In a dual panel apparatus according to another embodiment of the present invention, the number of first anode electrode layers in the first panel 500 may be more than that of second anode electrode layers in the second panel 502.

Figure 6:
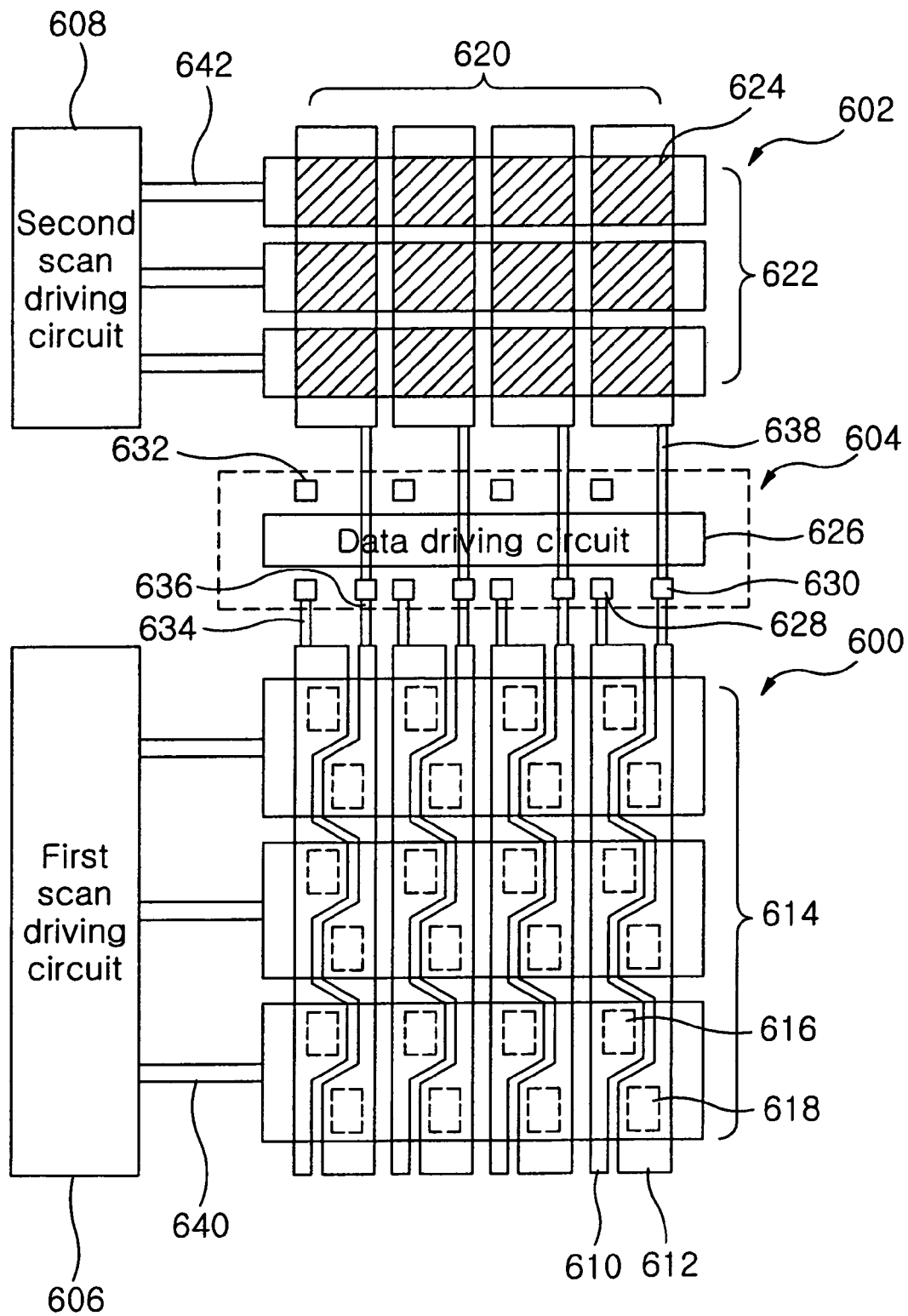
FIG. 6 is a view illustrating a dual panel apparatus according to a fourth embodiment of the present invention.

FIG. 6 is a view illustrating a dual panel apparatus according to a fourth embodiment of the present invention.

In FIG. 6, the dual panel apparatus of the present invention includes a first panel 600, a second panel 602, a data driver 604, a first scan driving circuit 606 and a second scan driving circuit 608.

The first panel 600 includes first anode electrode layers and first cathode electrode layers 614.

The first anode electrode layers include first sub anode electrode layers 610 and second sub anode electrode layers 612.

In addition, the first panel 600 includes first sub pixels 616 formed in cross areas of the first sub anode electrode layers 610 and the first cathode electrode layers 614 and second sub pixels 618 formed in cross areas of the second sub anode electrode layers 612 and the first cathode electrode layers 614.

The second panel 602 includes second pixels 624 formed in cross areas of second anode electrode layers 620 and second cathode electrode layers 622.

The data driver 604 includes a data driving circuit 626, first pads 628, second pads 630 and third pads 632.

The data driving circuit 626 transmits data signals to the first sub anode electrode layers 610 and the second electrode layers 620 through the first and second pads 628 and 630.

The first pads 628 are coupled to the first sub anode electrode layers 610 through first data lines 634.

The second pads 630 are coupled to the second sub anode electrode layers 612 through second data lines 636, and coupled to the second anode electrode layers 620 through third data lines 638.

The third pads 632 as pads for bonding maintain uniformly height of the dual panel apparatus when the data driver 604 is bonded with the first and second pads 600 and 602.

The first scan driving circuit 606 transmits first scan signals to the first cathode electrode layers 614 through first scan lines 640.

The second scan driving circuit 608 transmits second scan signals to the second cathode electrode layers 622 through second scan lines 642.

Hereinafter, the dual panel apparatuses in the third and the fourth embodiments will be compared.

The first panel 600 in the fourth embodiment is stack-typed panel, whereas the first panel 500 in the third embodiment is stripe type panel. Here, the cathode electrode layers in the stack-typed panel is generally wider than that in the stripe-typed panel, and so resistance of the cathode electrode layers 614 in the fourth embodiment is lower than that of the cathode electrode layers 512 in the third embodiment. Accordingly, the first panel 600 in the fourth embodiment has excellent characteristics than the first panel 500 in the third embodiment. Hence, the first panel 600 in the fourth embodiment is proper to a large size panel.

Hereinafter, the dual panel apparatuses in the second and fourth embodiments will be compared.

In the dual panel apparatus in the second embodiment, the data current is provided to the second anode electrode layers 220 through the first sub anode electrode layers 210. Therefore, the data driving circuit 226 should provide the data current having magnitude two times than current required for the first panel 200 to the first sub anode electrode layers 210.

However, the dual panel apparatus in the fourth embodiment, the data driver 604 is located between the first panel 600 and the second panel 602, and thus the data driving circuit 626 provides only requisite data current to each of the first panel 600 and the second panel 602. Accordingly, though current sources in the data driving circuit 626 in the fourth embodiment generate data current smaller than that in the data driving circuit 226 in the second embodiment, the dual panel apparatus in the fourth embodiment may have the same brightness as the dual panel apparatus in the second embodiment. In other words, in case that current source included in the data driving circuit 626 in the fourth embodiment is identical to that included in the data driving circuit 226 in the second embodiment, the dual panel apparatus in the fourth embodiment may have the same brightness as the dual panel apparatus in the second embodiment though the number of current sources in the data driving circuit 626 is smaller than that in the data driving circuit 226. Accordingly, the dual panel apparatus in the fourth embodiment may have size smaller than in the second embodiment.

From the preferred embodiments for the present invention, it is noted that modifications and variations can be made by a person skilled in the art in light of the above teachings. Therefore, it should be understood that changes may be made for a particular embodiment of the present invention within the scope and the spirit of the present invention outlined by the appended claims.

What is claimed is:

1. A dual panel apparatus comprising:
a first panel having a plurality of first pixels formed in cross areas of first and second data lines and first scan lines;
a second panel having a plurality of second pixels formed in cross areas of the first data lines and second scan lines; and
a data driver configured to provide compensating precharge current to only the first data lines,
wherein the data driver includes a controller configured to provide display data, a data driving circuit configured to provide data current to the first and second data lines, and a precharging circuit configured to provide precharge current corresponding to the provided display data to the first and second data lines and the compensating precharge current to only the first data lines,
wherein the precharging circuit includes a current circuit configured to have a plurality of current sources, and a switching circuit configured to switch the connection of the current circuit and the data lines.

2. The dual panel apparatus of claim 1, wherein the compensating precharge current is provided from the data driver to the first panel through the second panel.

3. The dual panel apparatus of claim 1, wherein the first panel or the second panel is stack-typed panel.

4. The dual panel apparatus of claim 1, wherein the data driver further includes:
   a discharging circuit configured to discharge the first and second data lines; and
   a data driving circuit configured to provide data current corresponding to the display data to the first and second data lines.

5. The dual panel apparatus of claim 4, wherein the plurality of current source includes at least one first current source coupled to the first data lines through the switching circuit, at least one second current source coupled to the second data lines through the switching circuit, and the first current source coupled to a corresponding data line during a first period of time corresponding to the display data and a second period of time corresponding to a load condition of the corresponding data line.

6. The dual panel apparatus of claim 4, wherein the switching circuit includes a plurality of switches coupled to the current sources,
   wherein the precharging circuit further includes a precharge controlling circuit configured to control the switching of the switches.

7. The dual panel apparatus of claim 1, wherein the panels display the same image.

8. A method of driving a dual panel apparatus including a first panel having first pixels formed in cross areas of first and second anode electrode layers and first scan lines and a second panel having second pixels formed in cross areas of the first anode electrode layers and second scan lines, wherein the first and second panels are organic electroluminescent panels, comprising:
   providing first scan signals to the first scan lines;
   providing second scan signals to the second scan lines;
   providing data current to the first anode electrode layer and second electrode layer; and
   providing precharge current to the first and second anode electrode layers, and compensating precharge current to only the first anode electrode layer,
   wherein the step of providing the compensating precharge current including:
   providing the precharge current generated from a first current source to the first anode electrode layer; and the compensating precharge current are generated from a same current source.
   providing the compensating precharge current generated from a second current source to only the first anode electrode layer.

9. The method of claim 8, wherein the precharge current and the compensating precharge current are generated from a same current source.

10. The dual panel apparatus of claim 1, wherein the current source includes a first current source coupled to the first data lines through the switching circuit, a second current source coupled to the first data lines through the switching circuit, and configured to provide the compensating precharge current to only the first data lines, and a third current source coupled to the second data lines through the switching circuit.

11. The dual panel apparatus of claim 1, wherein the first data lines are odd numbered data lines and the second data lines are even numbered data lines.

* * * * *